Patented Sept. 8, 1931

1,822,249

UNITED STATES PATENT OFFICE

ANDREW SZEGVARI, OF AKRON, OHIO, ASSIGNOR TO AMERICAN ANODE, INC., OF AKRON, OHIO, A CORPORATION OF DELAWARE

AQUEOUS DISPERSIONS OF ORGANIC SUBSTANCES

No Drawing. Application filed April 20, 1929. Serial No. 356,871.

This invention relates to the art of preparing aqueous dispersions or emulsions and has as its object to provide an improved method for preparing dispersions of organic substances with a uniformly small particle size and a permanent stability.

Many organic substances, especially such as are solid at ordinary temperatures, but are resinous in nature, or too soft to be ground readily, are difficult to disperse in water. Water dispersions of liquid substances are ordinarily prepared by emulsification, and dispersions of solid substances by fine grinding in the presence of protective colloids and emulsifying agents. However, many organic substances, particularly those of a resinous or bituminous nature do not become sufficiently fluid at temperatures below the boiling point of water to permit emulsification and at the same time are too soft and sticky to be ground successfully. An object of this invention is therefore to provide a method whereby organic substances, and particularly such substances as are to be added to rubber latex, may be finely dispersed in water.

This invention consists in preparing an aqueous dispersion of an organic substance by mixing the said substance with the liquid distillation product of rubber and dispersing the mixture in water, which may, if desired, contain emulsifying agents. The distillation product of rubber, which is employed as a solvent, is obtained by the destructive dry distillation of rubber, preferably scrap rubber, such as worn-out rubber boots, hose, tires, tire beads, etc. The distillation product is a very complex mixture containing considerable water mechanically suspended in a dark colored, strong smelling oil. A large part of the water separates out in a lower layer on standing, and may be drawn off. The supernatant mobile oil has a boiling-point range of from about room temperature to 250° C., the greater part of the liquid being quite volatile. The oily liquid obtained by distilling rubber will for convenience hereinafter be termed "rubber oil". Although the rubber oil is preferably obtained by the destructive distillation of vulcanized scrap, which is quite inexpensive and gives a very useful product, the raw material may be a rubber composition of any degree of vulcanization, from crude, unvulcanized rubber even to completely vulcanized hard rubber or ebonite, or rubber-like substances such as gutta-percha or synthetic rubber.

The rubber oil apparently consists essentially of hydrocarbons of varying molecular configuration, molecular weight, volatility and degree of chemical unsaturation in a complex mixture. The nature of the mixture depends to some extent on the conditions of the distillation, but chiefly on the character of the raw material. If the rubber oil is made from rubber containing considerable proportions of cellulose, comparatively large proportions of water and of oxygen compounds, possibly complex alcohols and ethers, will be formed, whereas if vulcanized rubber is employed, sulphur compounds, thioethers and mercaptans, tend to be formed. It is the latter which contribute chiefly to the odor of the oil.

The rubber oil possesses unusual advantages as a solvent for organic substances which are to be dispersed in water. It has an usually high solvent power for most common organic substances, quickly forming concentrated solutions of organic solids and mixing in all proportions with most organic liquids. Its extreme mobility, either when taken alone or when employed as a solvent for other materials, contributes to the ease of emulsification. It is believed also that some of the constituents of the rubber oil are of such a chemical nature that they themselves promote emulsification in alkaline media, since solutions containing the rubber oil in substantial proportions are much more readily emulsified than similar solutions containing other solvents. However, it is to be understood that it is not intended to limit the scope of this invention by any theories which may be advanced herein by way of illustration or explanation.

The rubber oil has been found extremely useful in the preparation of dispersions of many different classes of substances. It is used to reduce the viscosity of resinous substances to permit their emulsification. It is used to dissolve substances which normally absorb or otherwise hold considerable quantities of gas on their surfaces and are therefore difficult to wet or show a tendency to froth excessively when dispersed in the absence of solvents. Still other substances when dispersed alone assume a positive charge and are therefore incompatible with latex, the particles of which are normally negatively charged. Such substances, when mixed with rubber oil and dispersed in an alkaline solution, readily assume a negative charge and become freely miscible with latex and similar alkaline dispersions.

The use of rubber oil as a solvent for the preparation of dispersions which are to be admixed with rubber latex has been found particularly advantageous. The dispersions may readily be admixed with the latex without exhibiting any tendency to coagulate the latex or lower its stability. When the solid constituents of the latex admixtures are separated from the water, whether by electrodeposition, chemical coagulation, filtration, dessication, or any other method, the emulsions containing rubber oil readily unite with and permeate the rubber globules, forming a uniform compact mass of excellent properties. Upon drying, the volatile constituents of the rubber oil are readily eliminated, whereas the comparatively non-volatile portion remaining in the rubber, probably because of its close chemical relationship to the rubber from which it was derived, actually tends to improve the quality of the finished rubber, imparting to it a desirable softness and extensibility combined with high tensile strength, resistance to tearing, and resistance to the bad effects of aging.

In the practice of this invention the rubber oil may be, and frequently is, employed without rectification. However, in many cases a preliminary rectification, as by fractional distillation, is desirable. For example, in employing the rubber oil as a solvent in the preparation of dispersions which are to be mixed with rubber latex, the volatile, low-boiling fractions are selected if the presence of the oil in the finished product is not desired, whereas the non-volatile, high-boiling fractions are selected if it is desired to obtain a product softened and modified by the presence of the oil.

The proportion of rubber oil employed in dissolving the substance which is to be dispersed may be varied between wide limits. Substances of high melting point or relatively low solubility in rubber oil will require high proportions of the rubber oil, sometimes several times the weight of the substance itself. On the other hand, substances which have a low melting point and are readily miscible with rubber oil are easily dispersed after 10% or 20% of rubber oil has been added. For convenience, all such mixtures will be termed solutions, the rubber oil being the solvent.

The emulsion may be prepared by rapid and thorough agitation of the above-mentioned solution with pure water, but emulsifying agents and protective colloids are preferably added to stabilize the dispersion. For example, the water may contain one or more of such emulsifying agents as soap, saponin, gum arabic, agar, gelatine, casein, sodium silicate, alkali, ammonia, etc. The soap, saponin, and gum arabic probably function chiefly as peptizing agents or dispersing agents, while gelatine and casein are probably true protective colloids, forming protective films around the dispersed particles and preventing flocculation and aggregation. If desired, a portion of the emulsifying agents may be added to the rubber oil solution instead of to the water. Thus, if soap is to be employed it is often convenient to dissolve the fatty acid in the rubber oil and the alkali in the water, the soap being formed by reaction of the alkali with the fatty acid during the emulsification.

*Example 1*

The resinous condensation product of acetaldehyde and aniline is very useful as an accelerator of the vulcanization of rubber, but when powdered and added directly to latex settles out very rapidly and tends to induce coagulation. The accelerator is therefore dispersed in water as follows: 100 parts by weight of the accelerator, 200 parts rubber oil, and 10 parts oleic acid are melted together until a homogeneous solution is obtained. At the same time, 4 parts of casein are dissolved in 600 parts of hot water containing 30 parts of concentrated ammonia. The two liquids are stirred together until a coarse emulsion is obtained and the mixture is passed through a colloid mill or homogenizer which breaks up the oil droplets into very fine particles. The resulting dispersion is very stable, showing practically no tendency toward creaming or agglomeration. It may readily be mixed with alkaline latex without affecting the stability of the latex, the rubber derived from the latex mixture exhibiting the normal rate of vulcanization of rubber containing the said accelerator.

*Example 2*

The resinous anti-oxidant prepared by condensing aldol with alpha-naphthylamine is dispersed in water by dissolving 100 parts by weight of the aldol-alpha-naphthylamine in a mixture of 100 parts of rubber oil and 10 parts of oleic acid. The oil solution is emulsified in a solution of 2 parts gelatine and 14 parts concentrated ammonia in 650 parts of hot water in approximately the manner described in Example 1 above. The dispersion is very useful for the preparation of age-resisting latex rubber compositions.

Example 3

Bituminous substances are also readily amenable to dispersion by the method of this invention. Soft asphalt, coal tar, or the tarry residue collected from petroleum stills or cracking plants are dispersed by melting 80 parts by weight of the tar with 20 parts of rubber oil and 4 parts of oleic acid. The hot mixture is emulsified in a solution of 1 part casein and 10 parts concentrated ammonia in 400 parts hot water. The dispersion contains only a small proportion of rubber oil, but this small amount is sufficient to reduce the viscosity of the tar to the point where it is readily emulsified. It may be mixed with latex, the tar acting as a softener for the dry rubber, or may be applied as a coating to render surfaces water-resistant. Dispersions of the bituminous materials have the advantage of being very fluid at normal temperatures and not requiring heating when they are employed as coating compositions. Mineral rubber may be dispersed in a like manner.

Example 4

The addition of rubber oil to hydrocarbons prior to their dispersion contributes greatly to the ease of dispersion. 85 parts by weight of petrolatum melted with 15 parts of rubber oil are emulsified in a solution of 4 parts of ammonium oleate in 400 parts of hot water. The particles of the dispersion are very small and uniform in size.

It is to be understood that the foregoing examples are merely illustrative of specific embodiments of this invention; that other substances may be dispersed by the herein described method; that the proportions of the respective materials employed in preparing the dispersions may be varied within wide limits; and that any of the said materials may be replaced by other equivalent materials without departing from the spirit and scope of this invention as defined in the appended claims.

I claim:

1. The method of preparing aqueous dispersions of organic substances which comprises mixing said substances with rubber oil, and dispersing the mixture in water.

2. The method of preparing aqueous dispersions of resinous organic solids which comprises mixing said solids with rubber oil, and dispersing the mixture in water.

3. The method of preparing aqueous dispersions of organic substances which comprises mixing said substances with rubber oil, and dispersing the mixture in water containing emulsifying agents.

4. The method of preparing aqueous dispersions of nitrogenous organic substances which comprises mixing said substances with rubber oil, and dispersing the mixture in water containing rubber oil.

5. The method of preparing aqueous dispersions of the condensation products of aldehydes and amines which comprises dissolving the said condensation products and a small proportion of a fatty acid in rubber oil, and emulsifying the solution in water containing an alkali.

6. An aqueous dispersion of an organic substance comprising numerous fine particles of a mixture of said substance and rubber oil, suspended in an aqueous medium.

7. An aqueous dispersion comprising numerous fine particles suspended in an aqueous alkaline medium, said particles consisting of a resinous organic solid and rubber oil.

8. An aqueous dispersion comprising numerous fine particles suspended in an aqueous alkaline solution of an emulsion colloid, said particles consisting of rubber oil and the condensation product of an aldehyde with an amine.

In witness whereof I have hereunto set my hand this 18th day of April, 1929.

ANDREW SZEGVARI.

CERTIFICATE OF CORRECTION.

Patent No. 1,822,249. Granted September 8, 1931, to

ANDREW SZEGVARI.

It is hereby certified that error appears in the printed specification of the above numbered patent requiring correction as follows: Page 1, line 79, for the word "usually" read unusually; and that the said Letters Patent should be read with this correction therein that the same may conform to the record of the case in the Patent Office.

Signed and sealed this 8th day of December, A. D. 1931.

M. J. Moore,
Acting Commissioner of Patents.

(Seal)